United States Patent [19]
Varian

[11] Patent Number: 5,717,552
[45] Date of Patent: Feb. 10, 1998

[54] MAGNETIC CORE WITH FIELD CONFINEMENT STRUCTURE

[75] Inventor: George R. Varian, Palo Alto, Calif.

[73] Assignee: Ampex Corporation, Redwood City, Calif.

[21] Appl. No.: 709,800

[22] Filed: Sep. 10, 1996

[51] Int. Cl.$^6$ ........................................ G11B 5/127
[52] U.S. Cl. ............................................. 360/125
[58] Field of Search .......................... 360/125, 126, 360/128

[56] References Cited

U.S. PATENT DOCUMENTS

| | | | |
|---|---|---|---|
| 3,432,839 | 3/1969 | Stapper | 360/129 |
| 3,744,040 | 7/1973 | Honegger et al. | 360/121 |
| 3,969,771 | 7/1976 | Suzuki et al. | 360/121 |
| 4,356,524 | 10/1982 | Watanabe | 360/129 |
| 4,751,598 | 6/1988 | Hamilton | 360/125 |
| 4,996,620 | 2/1991 | Orton | 360/121 |
| 5,075,280 | 12/1991 | Pisharody et al. | 360/119 X |
| 5,075,809 | 12/1991 | Heinz et al. | 360/128 |
| 5,075,956 | 12/1991 | Das | 29/603 |
| 5,091,253 | 2/1992 | Smith et al. | 360/125 X |
| 5,095,397 | 3/1992 | Nagata et al. | 360/113 |
| 5,189,580 | 2/1993 | Pisharody et al. | 360/126 |
| 5,311,386 | 5/1994 | Mallary | 360/126 |
| 5,436,779 | 7/1995 | Valstyn | 360/125 X |
| 5,450,263 | 9/1995 | Desaigoudar et al. | 360/125 X |

*Primary Examiner*—John H. Wolff
*Attorney, Agent, or Firm*—James M. Thomson; John G. Mesaros

[57] ABSTRACT

An improved, shielded magnetic core structure is disclosed that is particularly well suited for use in magnetic read and write heads adapted for narrow track, short wavelength magnetic recording systems, and for transformers of high performance, wide band application. The improved magnetic cores use novel field confinement structures to reduce or eliminate leakage magnetic paths which normally do not link the head gap or do not link the transformer windings. This shielding arrangement substantially improves the performance of such devices, as compared to conventional, unshielded heads and transformers. Embodiments involving toroidal cores, thin film heads, and MR heads are disclosed, along with high performance, wide band transformer structures.

20 Claims, 6 Drawing Sheets

MAGNETIC CORE WITH FIELD CONFINEMENT STRUCTURE

BACKGROUND OF THE INVENTION

The present invention relates to improved, shielded magnetic cores that are particularly well suited for use in read and write heads adapted for narrow track, short wavelength magnetic recording systems, as well as for high performance, wide band transformers. More particularly, the invention relates to improved magnetic cores that use novel field confinement structures to reduce or eliminate magnetic paths, such as leakage field paths, which do not link the gap in the core to the head windings, or do not link transformer primary and secondary windings, thereby improving the performance of such devices as compared to the performance of conventional, unshielded heads and transformers.

Traditional ferrite, magnetic recording and reproducing heads are usually constructed with a ring core, having a gap formed therein, which is wound with wire windings. As a result of design changes, track dimensions in contemporary recording devices have been reduced in recent years to the point that the maximum dimension of the head core may now be as much as 100 times the track width. This dimensional anomaly has developed as a result of the need to maintain certain minimum dimensions for the core and the wire that is used to wind the core in order to provide acceptable coil resistance and head inductance levels. Consequently, head core sizes have not been reduced by the same scale as track widths over the last few years. This, in turn, has left head structures with leakage paths that result in relatively high inductance and lower signal to noise ratios than are desired.

Thin film head designs that have been developed recently have resulted in reduced head core dimensions, correspondingly reduced leakage paths and improved signal to noise ratios. In fact, in some recent thin film designs the head coil has been reduced in size to the extent that it can be plated into the winding window. However, such designs still retain significant leakage paths. Moreover, when the cross-section of the winding conductors must be made small enough to fit into the winding window, the coil resistance also becomes sufficiently high that it is a problem.

Other design efforts have led to wide commercialization of MR heads, with the effect of reducing the scale of head cores, increasing head sensitivity and increasing head signal to noise ratios. However, a need still exists in the art for improved head structures.

Likewise, in high frequency transformers, when core permeability decreases, leakage fields are manifested as leakage inductance, i.e. an inductance effectively in series between the transformer input and output terminals. Such leakage inductance limits the maximum frequency passed by the transformer at low loss and results in significant debilitation in performance of such devices. Accordingly, a need also exists for improved transformer core structures that exhibit lower leakage inductance.

SUMMARY OF THE INVENTION

The inventor of this application has recognized that most of the leakage field paths for narrow track heads occur adjacent to the sides of the head. In accordance with known field principles, the fields associated with these leakage paths extend a distance from the head that is on the order of the maximum physical dimension of the head, core and the leakage path widths are on the order of the head core dimension squared. Consequently, the reluctance of such leakage paths is on the order of the reciprocal of the maximum head core dimension.

For example, if the track width and gap depth are about 1/100th of the maximum head dimension, and the gap length is about 1/10000 of the maximum head core dimension (i.e. the approximate scale of ferrite heads presently used in disk and rotary head core recorders), then the reluctance of the leakage path will be about the same as the reluctance of the gap.

Therefore, in accordance with the invention, it is contemplated that conductive shields be placed proximate to and surrounding the head core and windings of magnetic heads. The shields must be arranged such that no shorted turn is formed by or exists within the shield passing around the head core, as this would shunt the desired signal. It is also desirable to omit use of shields near the recording gap, since this maximizes coupling between the core and the magnetic media. It has been found that reducing the large existing leakage paths, by use of shielding, reduces head impedance and improves head signal to noise ratios. Also, with a shielded core structure, more turns can be wound on a given coil, which results in a higher output voltage for the same level of head impedance. Since the deleterious effects of the leakage paths are controlled by the shields, a shielded core can be made sufficiently large to allow suitable low resistance windings.

In order to more clearly understand the coincident impact of these factors in connection with transformers, it should be understood that permeable magnetic cores are used to couple a source of magnetic field to a detector, by channeling the magnetic field through the core to the detector. In the case of transformers, the source and the detector of the magnetic field are primary and secondary windings wound upon the core. (In contrast, in the case of magnetic write heads, the source is a coil wound upon the head core and the detector is a magnetic medium placed proximate to the gap in the head core. In the case of magnetic read heads the source is the field generated by a previously recorded magnetic medium located proximate the gap in the head core, and the detector is a coil wound upon the head core, or a magnetic field detector placed so that the magnetic field in the core will pass through the detector.)

In either the case of heads or transformers, if the reluctance of the core, i.e. the reluctance of the path linking the magnetic field source to the detector, is much smaller than that of the paths that do not link the field source to the detector, the power transfer from source to detector will be high. However, at higher frequents, the permeability of magnetic material decreases. As a result, the core reluctance increases at such higher frequencies. At the same time, the magnetic field paths that fail to link the magnetic field source and the detector are both shorter and wider than the paths that do pass through the core. As core permeability drops, the magnetic fields in the leakage path increase significantly. This leads to a particularly significant degradation of transformer performance at high frequency.

With respect to high frequency transformers, the primary and secondary windings have traditionally been placed in close proximity to each other in order to improve the magnetic coupling between the source and the detector. A limitation as to the effectiveness of this technique eventually occurs since it is physically difficult to place more that three windings adjacent to or in close proximity to each other. Consequently, this limits the choice of transformer ratios that may be employed.

Also, when the primary and the secondary windings are in close proximity, electrostatic coupling occurs between the primary and the secondary. This results in transformer balance and frequency response problems in conventional devices. In similar fashion, with magnetic recording heads the degree of proximity of the winding to the gap is limited, otherwise the windings tend to interfere with the gap-recording medium interface.

Therefore, an important feature of the present invention is the use of conductive shields to confine magnetic leakage fields that occur particularly at high frequencies in magnetic devices in a region proximate the device "core". The shielding and the field confinement that results therefrom ultimately enable the existing fields between the source and the detector of the magnetic device to couple to a maximum degree.

It is well known that alternating magnetic fields cannot penetrate a conductor to a dimension greater that about its skin depth. For example, At 1 MHz operating frequency, the skin depth of copper is about 70 micrometers. This skin depth decreases in proportion to the square root of frequency as signal frequency increases. Thus, it is possible in accordance with the invention, to take advantage of skin depth characteristics of conductive materials in order to confine an alternating magnetic field, essentially, within or proximate to the core of a given magnetic device, by mapping the core with a thin layer of conductive material designed to take advantage of skin effect in acting as a shield.

Other than surrounding the portions of the core structure, the only other physical requirement for the conductive shield is that it must not form a shorted turn around the desired magnetic path in the core. In order to prevent this, in accordance with the invention, a physical opening or "current interrupting cut" is provided in the shield, at one or more carefully selected locations, to prevent such a shorted turn from occurring. For example, with a magnetic device embodying a toroidal core, of the hole in the core is vertically oriented, any horizontal cut through the conductive shield that extends all the way around the core either in the hole or on the outside of the toroid will be suitable. The shield on the two sides of the cut may generally abut and be separated by a small gap. Alternatively the sides may overlay and be separated by a small gap. The gap is provided to inhibit current flow across the cut. Multiple cuts may be used, of desired, in other configurations, as will become apparent when particular embodiments of the invention are discussed herein.

Since the current interrupting cut in the shield also introduces a path for magnetic fields that do not link the source and the detector, and since the distribution of magnetic fields between the two paths is inversely proportional to the reluctance of the paths, it has been recognized that it is desirable to make the reluctance of this leakage path large as compared to the reluctance of the path linking the source and the detector. The leakage path reluctance can be made large by making the length of the cut in the direction of the field large. This can be done by making the shield overlap upon itself at the cut. On the other hand, the leakage path reluctance is increased by making the distance between the source and the detector small or by making the current interrupting cut separation small. However, the effective cut separation is always greater than the actual separation by at least a skin depth. Also, the separation at the current interrupting cut must be large enough so that capacitive currents across the cut are small when compared to the currents within the shield. Additionally, the core reluctance may be made low by using a high permeability core material, and by making the core cross-section large and the core path length short. In view of these capabilities and factors, it should be apparent that the core and cut dimensions and the core permeability can readily be chosen to establish the desired level of high coupling between the source and the detector.

It has further been recognized, in accordance with the invention, that when a coil is wound on a shielded core, it may be wound between the core and the shield or on the outside of the shield with much the same advantageous shielding effect. Magnetic fields that exist in the space between the winding and the conductive shield do not couple the magnetic field between the source and the detector. Consequently, the reluctance of such a field path can be made high by placing the winding proximate to the shield structure. Moreover, the reluctance of this field path, when compared to core reluctance, is multiplied by the number of turns in the coil, squared.

Therefore, it should be apparent that when a coil is wound upon a core provided with a shield structure constructed in accordance with the invention, an equivalent "transmission line" is created between the core and the shield. This equivalent transmission line causes an image current to flow in the shield that nearly cancels the alternating current in the coil except where the coil crosses the cut. Opposing currents flow along the opposite sides of the cut, and return in a distributed manner across the shield in the direction of the alternating current in the coil. Consequently, the total alternating current in the coil and conductive shield structure is distributed in such a way as to confine the alternating magnetic fields within the shield, with the exception of the cut field and the winding field described above.

Accordingly, it has been found that the concept of using a conductive shielded structure to confine fields within a magnetic path, and thereby eliminate or minimize leakage field effects in such a device can be used to great advantage.

BRIEF DESCRIPTION OF THE DRAWINGS

The above and other features and advantages of the invention will become apparent from the following detailed description of the preferred embodiments of the invention, taken in conjunction with the accompanying drawings, in which.

DETAILED DESCRIPTION OF THE PREFERRED EMBODIMENTS

Figure 1:
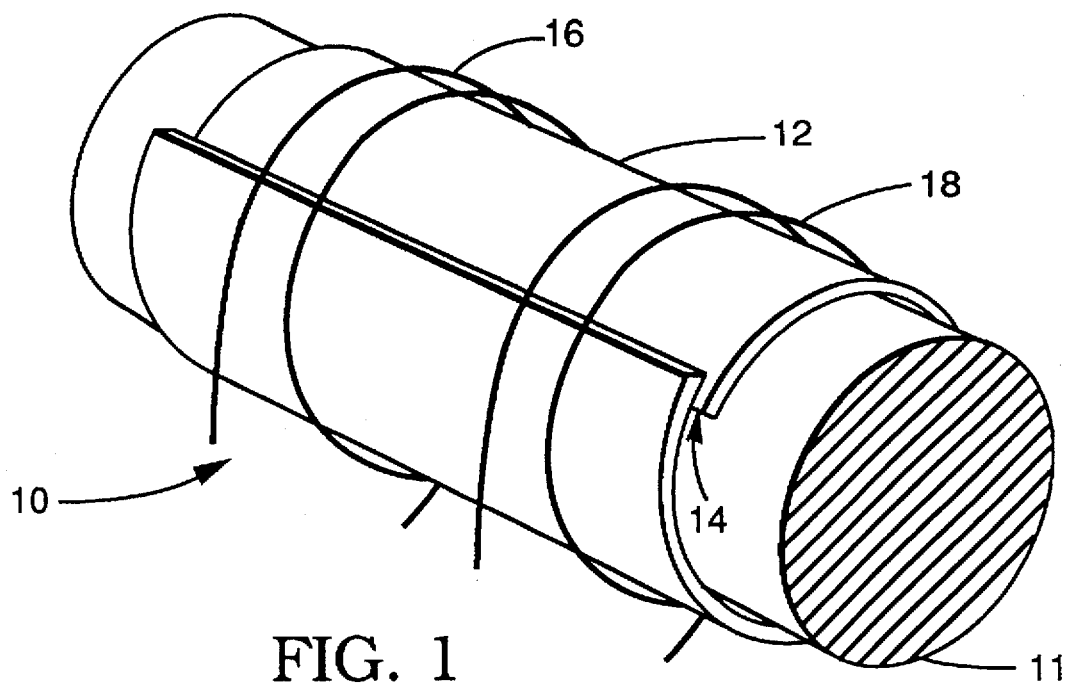
FIG. 1 is a perspective view of a section of a core having a shield and windings associated therewith.
Figure 2:
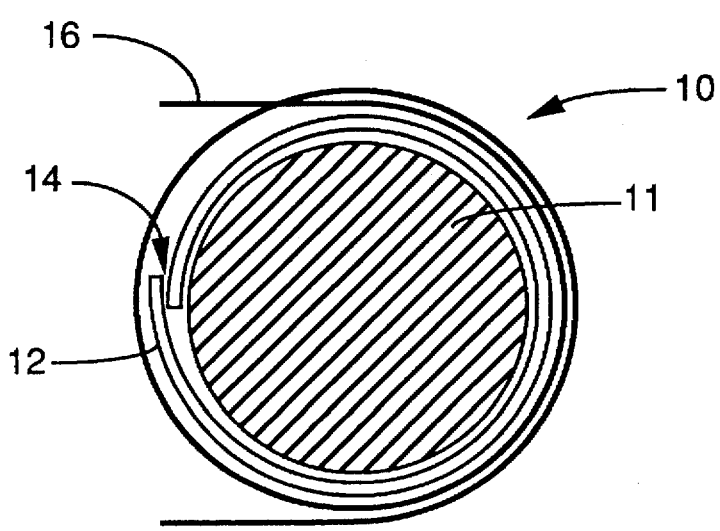
FIG. 2 is a cross-sectional view of the structure illustrated in FIG. 1.
Figure 3:
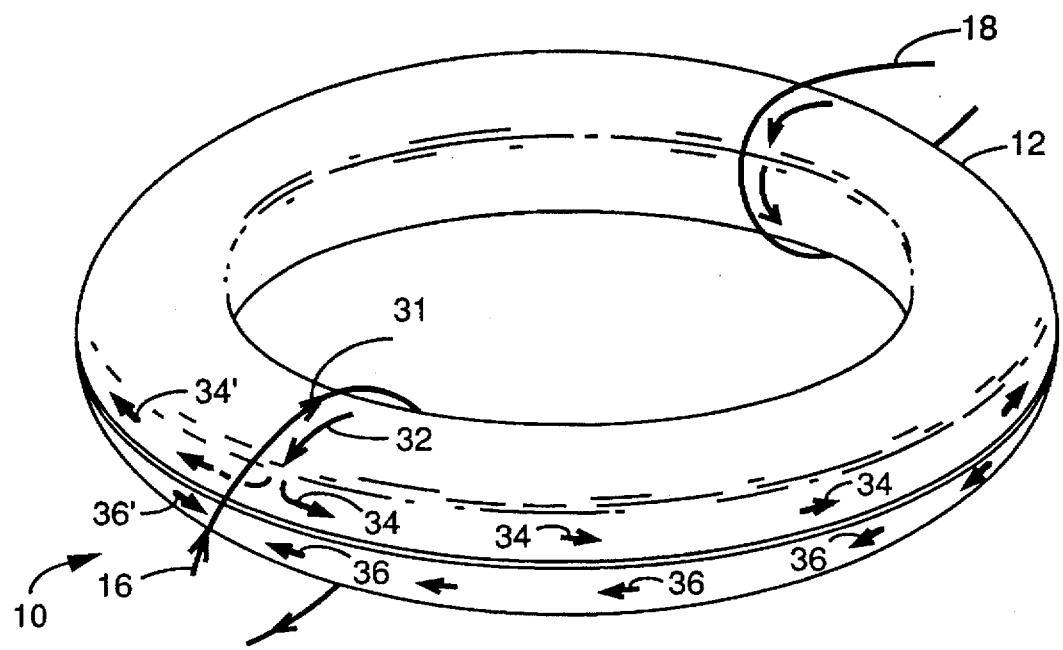
FIG. 3 is a perspective view of a toroidal core and shield having a structure similar to that illustrated in FIG. 1, with orientation of the induced currents associated with the device being illustrated by arrows as shown.

Referring now to the drawings and particularly to FIGS. 1–3, part of a shielded magnetic core 10, is illustrated including a core section 11 of high permeability magnetic material, surrounded by a thin layer of conductive material comprising a shield 12. As shown, the shield generally extends around the periphery of the core section and is slightly overwrapped, as best seen in FIG. 2, to entirely encompass the core except for a small space or cut 14 formed in the shield along the full extent of the detector winding 18 winding 16, and a detector winding 18 are schematically illustrated as being wound on the core, section over the shield. In the embodiment illustrated, in FIG. 3 the core can be formed of a high permeability core material such as ferrite, and the shield can be fabricated of a conductive material such as copper. Any suitable winding material, such as copper for example, can be used for the windings. For a 4 mm toroidal core with a 2 mm hole, operating at frequencies up to 100 MHz, a 10 micro meter thick shield with a cut located around the outer periphery of the toroid, or in the hole with a spacing of about 50 micro meters and an overlap of 1 milli meter will yield low leakage and low gap inductance.

The core 10 is particularly suitable for use in a transformer structure and the shielding, in that event, will act to reduce leakage fields that otherwise might escape the magnetic circuit of the transformer. The elimination of such leakage fields clearly will result in improved performance of the transformer, including reduced loss and increased bandwidth.

An analysis of the currents and magnetic flux conditions within the transformer is included hereinafter in conjunction with FIG. 3, wherein it should be recognized that an instantaneous current condition is depicted, as would result from energization of the source winding by an alternating signal source.

In FIG. 3, winding 16 represents a turn of a source winding positioned upon the shielded core. The direction of a momentary primary current induced in the winding is indicated by arrows 31, which indicate that the current will tend to flow around the shield and the core, linking the core. Since the winding 16 is positioned close to the shield, there will be an image current 32 induced in the shield having approximately the same magnitude as the primary current and flowing in the opposite direction. The image current is, however, prevented from flowing completely around the shield by the physical presence of the current interrupting cut in the shield (which the image current cannot cross). Since the image current must flow somewhere, it divides and flows along paths 34, 34' in either direction along the upper side of the cut. These currents are balanced by equal and opposite currents 36, 36' flowing along the lower side of the cut, which will join to reform the image current of the primary on the lower side of the cut.

To complete the circuit associated with the shield by forming a circulating pattern in the shield, the current in the shield must flow around the core from the top side of the cut to the bottom side of the cut, which is in the direction of the current in the primary winding. If there is corresponding current in a secondary winding, a return current flowing along similar divided and recombining paths will occur in the shield and as the image current of the secondary winding current. The circulating current in the shield thus formed efficiently couples the primary and secondary windings.

The result of these induced currents is to produce excellent coupling between the primary and secondary windings of the transformer, much like the coupling that is achieved within the windings of a bifilar wound transformer. However, it should be recognized that the performance of this magnetic device is achieved without any of the corresponding restrictions on turns ratio and winding proximity that occur with a bifilar winding arrangement.

It should also be recognized that, in the arrangement described, any return currents that are not linked to currents in the secondary windings will tend to cause the flow of a uniformly distributed sheet current around the core and shield from one side of the cut to the other. This sheet current results in a net magnetization within the core. Moreover, since there is no magnetic field outside a uniform cylindrical current sheet, this condition is consistent with the premise that no portion of the alternating magnetic field from the core will penetrate the shield. Under these conditions the magnetic path is confined by the shield so that it substantially links the primary and secondary windings.

It is possible to configure the embodiment illustrated in FIGS. 1-3 for use as a magnetic recording head, if desired. This would be done, for example, by providing a gap in the core structure at a location proximate an opening in the shield. A field sensing element would be used to sense the magnetic field that occurs in the vicinity of the core gap, in well known fashion. The winding configuration would also be adjusted for head utility rather that use of the core in transformer configuration. It should be recognized that this suggested alteration in structure can be made to take advantage of the use of leakage path confining shields in cores that, in actuality, have greatly diverse application, for example in the detection of small signals in narrow track recording applications and/or in the operation of core transformers of much larger physical scale such as those used for radio frequency power amplifiers.

At the same time it should be recognized that use of shielding in accordance with the invention will be described hereinafter in conjunction with diverse transformer core and head core structures involving physical embodiments that are of markedly different configuration, and are that designed to function in substantially different surroundings to solve remarkably different problems.

Figure 4:
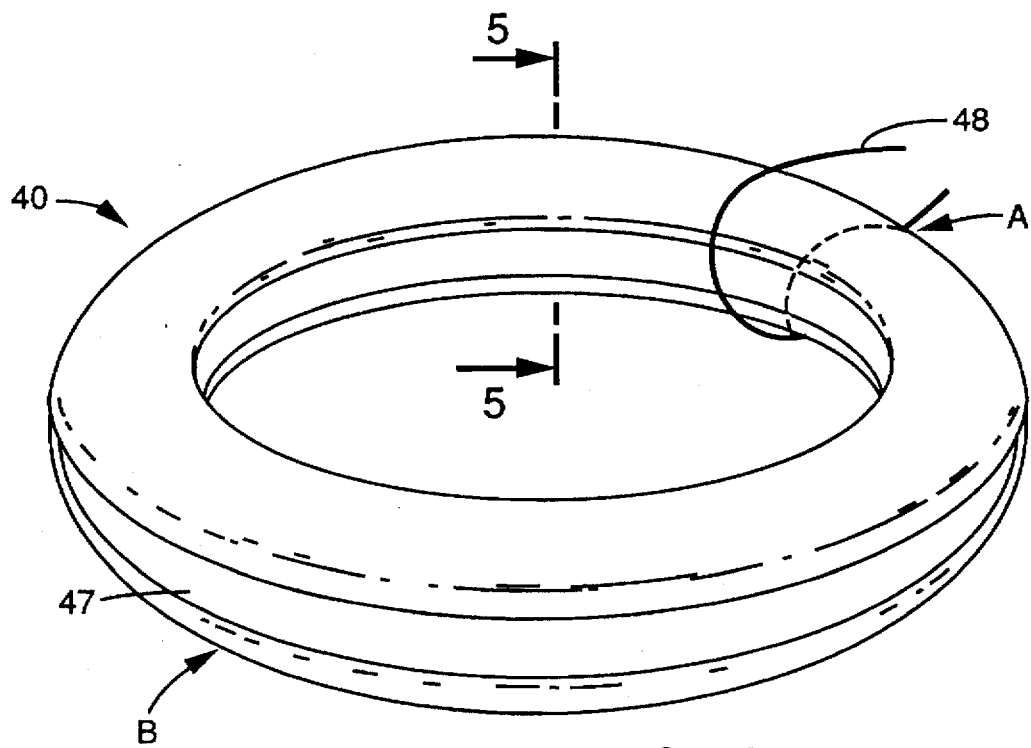
FIG. 4 is a perspective view of a toroidal core with a shield, having a square cross-section.
Figure 5:
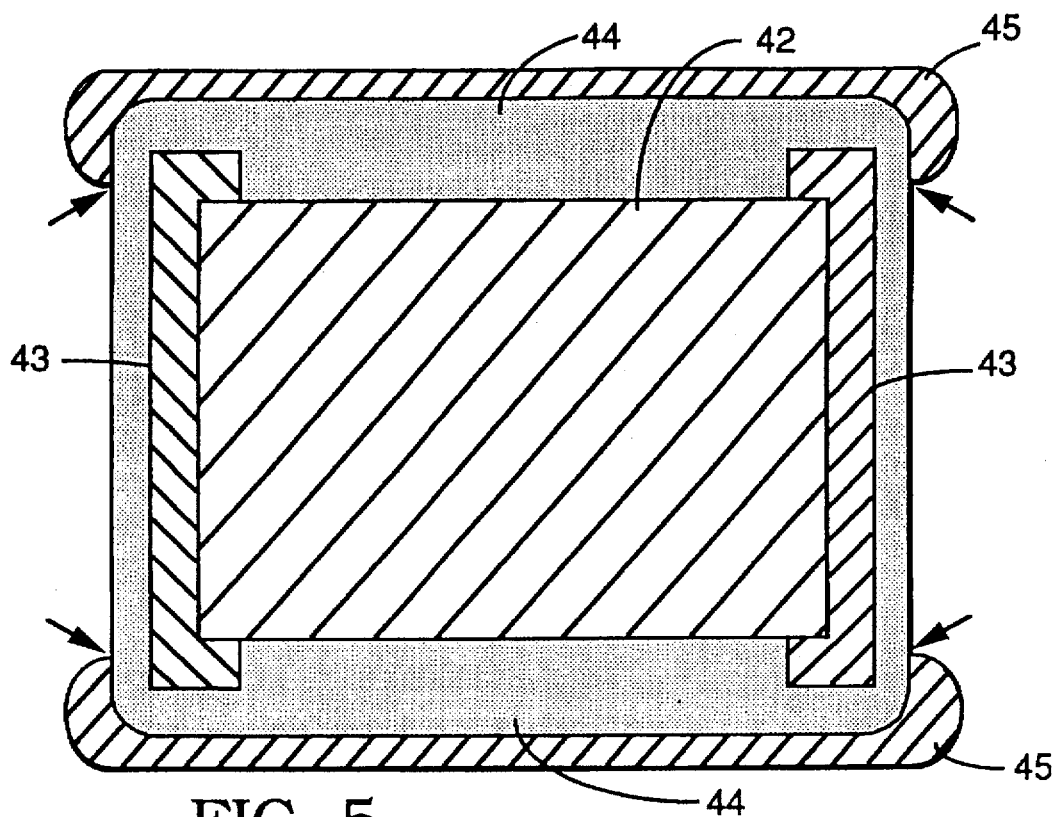
FIG. 5 is a cross-sectional view of the toroidal core illustrated in FIG. 4 with primary and secondary windings.
Figure 6:
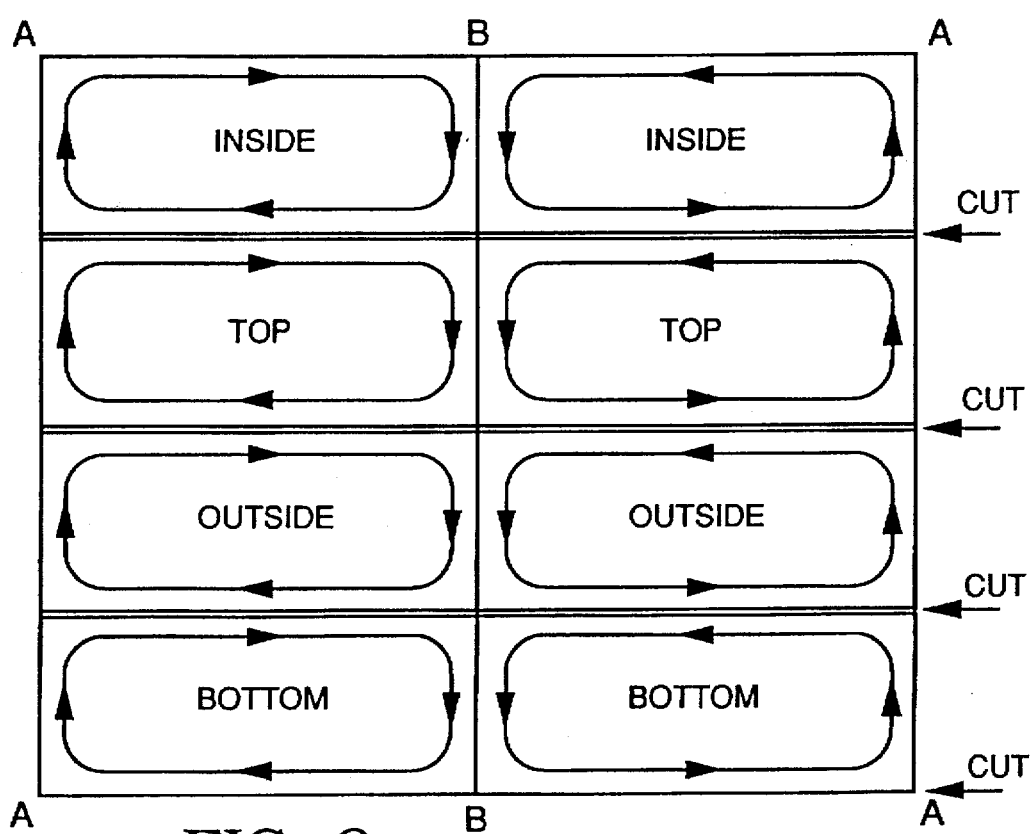
FIG. 6 is a diagrammatic view of the shield of a toroidal core such as that illustrated in FIG. 4 including arrows that indicate the direction of current flow in the shield.

Referring now to FIGS. 4-6, another magnetic toroidal core 40 is illustrated having a generally square cross-section. As best seen in FIG. 5, the shield structure is formed by first covering two of the sides of the core cross-section with thin coatings 43 of a suitable conductive material such as copper foil. The coatings 43 are overlapped slightly over the corners of the core, as illustrated. Next the entire surface of the toroid is covered with a thin, conformal coating of a non-conductive material such as lacquer, appearing as layer 44 in FIG. 5. Finally, the other two sides of the core are covered with thin coatings 45 of conductive material such as copper foil about 1 mil in thickness, that again overextend the corners of the core. As a result, it should be apparent that a shielded structure is provided that effectively encapsulates the entire toroid and provides four current interrupting cut structures, i.e. at the corners of the core cross-section, as generally indicated by the arrows at those locations. This provides excellent isolation of the structure as needed to prevent a "shorted turn" on the core.

Windings 47, 48 are schematically illustrated on the toroid and serve the same function as the primary and secondary windings on toroid 10 illustrated in FIG. 1-3. Since the structure illustrated in FIGS. 4-6 is provided with four cuts, it should be recognized that the instantaneous currents and induced currents will take different paths than those illustrated in the unwrapped map of the toroidal surface illustrated in FIG. 4. For example, directional arrows indicate the path and direction of instantaneous currents that flow in the regions defined in FIG. 6 as, top, bottom, inside and outside of the toroid surface along Sections A and B that indicate the surface areas of the toroid between the windings.

Figure 7:
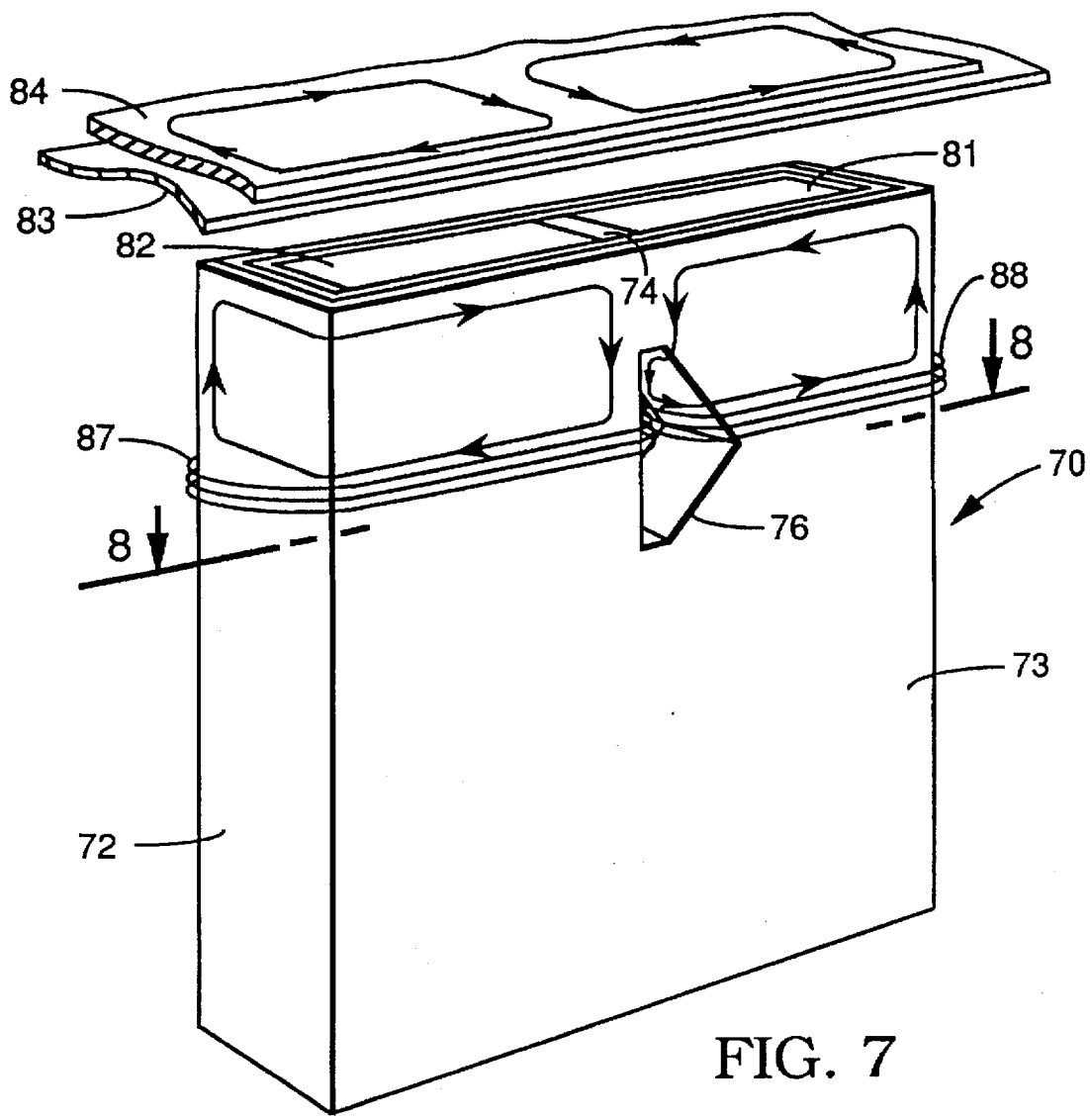
FIG. 7 is a perspective view of a shielded head structure designed in accordance with the invention.
Figure 8:
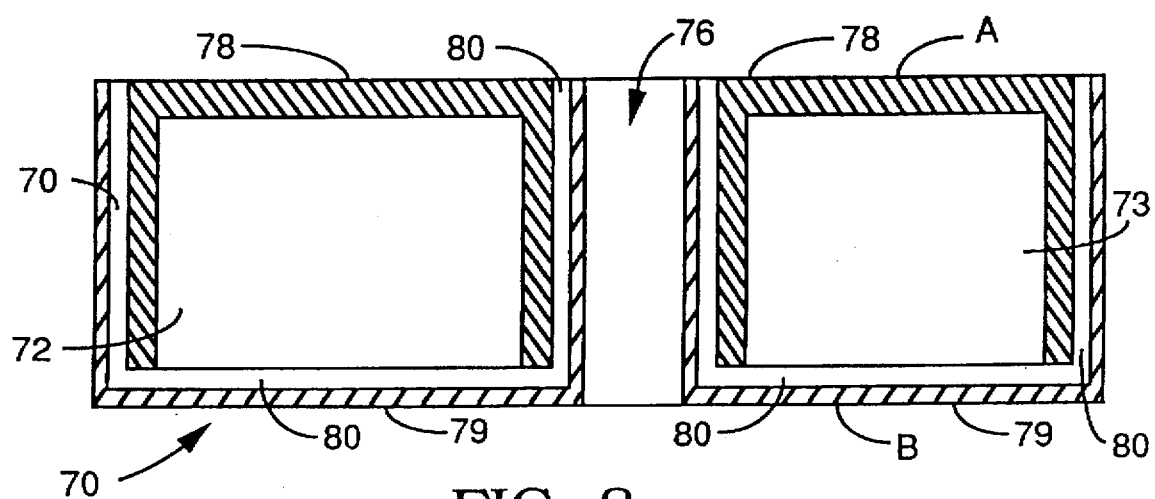
FIG. 8 is a sectional view of the head structure illustrated in FIG. 7.

Referring now to FIGS. 7-8, another magnetic core structure 70 is illustrated, suitable for use in the context of a magnetic recording head. The core structure includes magnetic members 72, 73 located on either side of a gap structure 74, comprised of glass or another suitable non-magnetic material as best seen in FIG. 8. A winding window 76 is formed in the core so that the gap extends from the top face of the head into the winding window.

As seen in FIG. 7, a composite shield is formed around the core structure including a first thin conductive layer 78 covering all sides of the core except for the top and front and a second thin conductive layer 79 formed around all sides of the core except the top and back. The thin conductive layers are separated by narrow regions filled with non-conducting material 80 to provide current interrupting cuts in the conductive layers to form a conductive shield. FIG. 8 is a cross-section taken through the winding window illustrating details of the shield inside the core.

The conductive layers can be constructed in the configuration shown by plating or sputtering the core structure with a conformal coating of a suitable conductive coating material such as copper, on Side A. Following application of the first layer of conductive material, a thin, conformal coating of a non-conductive material such as lacquer, photo resist, or glass can be applied over the entire head surface. Following application of this coating, another thin layer of conductive material such as copper can then be applied to form layer 79 on the other side of the head. These applied materials are then removed from the face of the head.

In the configuration illustrated a current interrupting cut is included in the winding window and a second current interrupting cut is represented around the outer perimeter of the head. Only one of these cuts is required, but two cuts will be formed if a conformal, non-conductive coating is applied between the application of the two conductive coatings, as described herein.

In the embodiment illustrated, a thin layer of magnetic recording material 83 is illustrated in spaced, movable relationship to the head surface. In addition, a thin layer of a suitable conductive material, such as aluminum, can be employed as a backing 84 for the recording surface, and will act as a shield over the top of the head during operation thereof. It should be recognized that such a structure could be comprised of the surface of a typical recording disc, having an aluminum susbstrate.

The winding window of the head is designed to be of satisfactory size to accommodate windings, for a high frequency magnetic head. For example, for a ferrite or mig head operating at frequencies up to 50 MHz, with a 0.5 mm winding window, a 0.25 micro meter gap length, a 1 micro meter gap depth, a shield having a thickness of 10 micro meters with a cut located at the winding window having a spacing of about 5 micro meters and an overlap of 0.25 milli meters, or about the thickness of the head core, will result in effective shielding for the core. It should be recognized that in the manufacture of such a mig head, it would be usual to include a track width defining "finger" in order to reduce the head face width to the desired track width. This finger, not illustrated, then might have a dimension of 5 micro meters in context of a head having the other dimensions mentioned hereinbefore.

In the embodiment illustrated, the alternating fields originating in the moving magnetic medium 83 are channeled from the core faces illustrated in FIG. 3 through the magnetic path defined by core pieces 72,73 and around the winding window 76. The fields in this path are well confined within the core and therefore efficiently link windings such as are indicated by numerals 87,88 that are wound through the window and around the core pieces.

Figure 9:
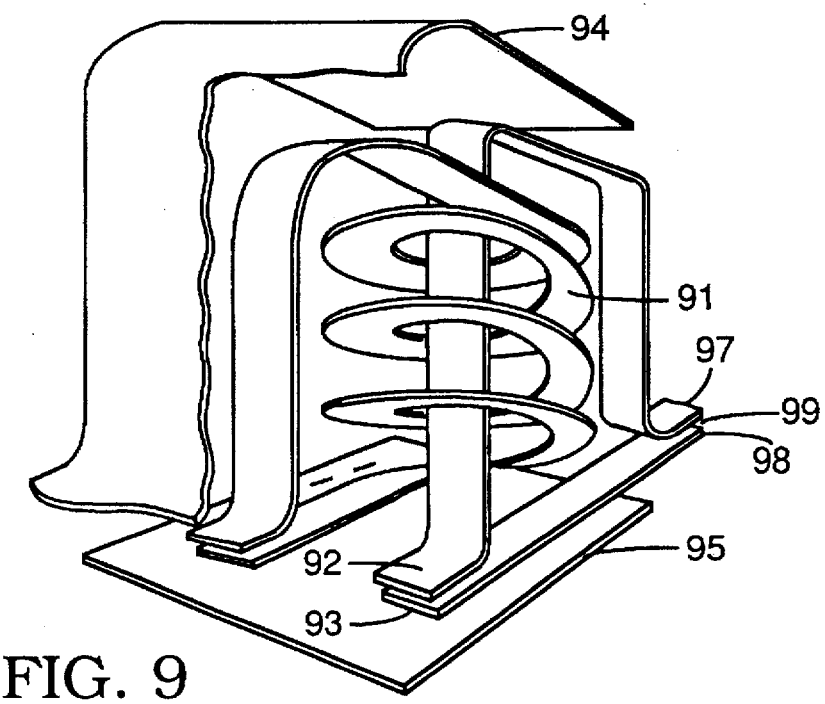
FIG. 9 is an exploded, diagrammatic, perspective view of a shielded thin film head structure of generally helical configuration.
Figure 10:
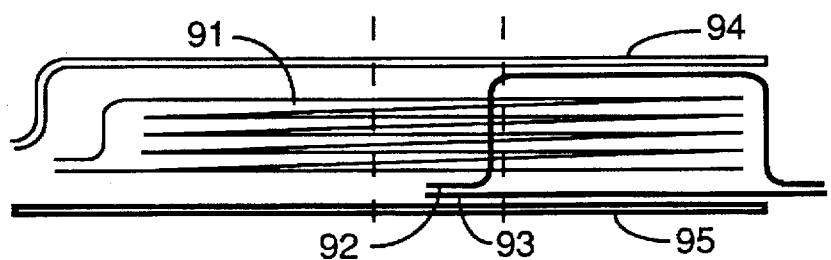
FIG. 10 is a diagrammatic, cross-sectional view of a structure similar to that illustrated in FIG. 9.

FIGS. 9 and 10 represent another embodiment of the invention with FIG. 9 comprising an exploded, perspective view of a thin film head structure constructed to incorporate and take advantage of field confinement shield features as contemplated herein. A helical winding 91 is generally represented, associated with core members 92,93. In addition, conductive shields 94,95 are illustrated enclosing the head structure with the exception of the region near the core tips 97,98 of the core structure which are located proximate to the recording medium, not illustrated. It is contemplated that the core members, windings, and shields will be separated from each other by non-conductive layers, not illustrated.

The core pieces may be fabricated from a soft magnetic film material such as nickel iron, and are separated by a gap 99 located dose to the recording medium. The winding is illustrated as a continuous helical shaped member fabricated from multiple layers of conductive material such as copper, which can be separated by non-conductive layers, and where each conductive layer forms nearly one turn would be, and wherein each conductive turn is connected to the next by conductive material deposited through holes in the non-conductive layers.

The conductive shields do not pass through the core. Thus, the separation between the shield members 94,95 to form the current interrupting cut which is provided to prevent linkage of the core can be relatively large. This might allow substantial leakage fields to occurr in a vertical orientation between the core pieces. That possibility can be minimized by making the winding in the form of uninterrupted horizontal conductive planes oriented between the core pieces. The winding itself then acts as a shield as it passes through the core. Since the winding is not a shorted turn, and it is isolated from the conductive shields, no conductive path links the core. The current interrupting cuts are then comprised of the separations at the start and the end of the winding, and by the separation of the winding from the conductive shields.

It should be noted that the use of a horizontal helical winding can be distinguished from the spiral windings more commonly used in the art. Such spiral windings have many more turns on each layer, separated by gaps. Each turn is typically less that a skin depth in the conductor, and therefore spiral windings do not have the inherent shielding effect with respect to the core pieces that exists within the present design.

A head with a relatively small number of turns, as described herein, may not match the optimum source impedance found in conventional read amplifiers. However, this can be remedied by "following" the head with a transformer. For example, a four turn head may be followed by a 1:20 turn transformer that provides an output voltage and impedance level similar to that of an 80 turn head. Such a transformer, wound upon a field confined core would be suitable for this use.

It should also be noted that the conductive surfaces in and around the thin film head structure, i.e. the top and bottom shields, the coil, and the substrate of the recording medium, if applicable, can be designed and used in cooperative fashion to additionally shield the core structure and further reduce leakage fields. This can also result in positive contributions to reduced head impedance and increased read signal levels.

Figure 11:
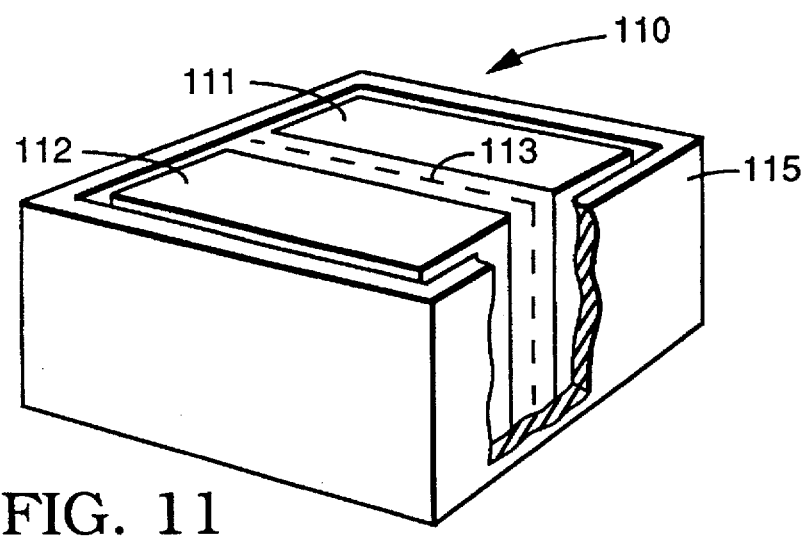
FIG. 11 is a perspective illustration of a model of a shielded, magnetoresistive head.

FIG. 11 illustrates a diagrammatic representation of a magnetoresistive head 110 employing a field confinement shield arrangement. In order to avoid confusion, MR shield elements 111, 112 will be referred to herein as core pieces to differentiate them from the conductive shields provided herein since they act as magnetic field path members rather than barrier like conductive shields. It should be noted that in the usual function of an MR head, the magnetic fields fringing from the recording medium proximate to the top of the head structure tend to pass through the magnetorestrictive element 113 positioned in the gap between the core pieces with the core pieces cooperating to form a magnetic field path.

The sides of the head that are not positioned close to the recording medium are surrounded by a conductive shield 115. The shield prevents fields from bridging the gap at its sides to extend beyond one skin depth into the shield. The confinement of the fields that is attained in this fashion forces more of the available field through the MR element where it can be detected. If the recording medium includes a conductive substrate, such as would be the case in commonly employed disc structures, that substrate can be positioned to cooperate with the other shield structures to confine the fields on all sides of the head. If the substrate of the storage recording medium is non-conductive, the current interrupting cut then exists in the form of the unshielded face portion of the head located proximate the storage medium. Stated otherwise, the current opposing the field passing through the core pieces and the MR element would have to cross the surface of the head, parallel to the gap.

If the substrate of a storage medium is conductive, the current interrupting cut then exists due to the separation between the conductive shield and the substrate. Thus, a magnetic path is established from a magnetic recording medium through a field detecting element via the core pieces and is confined to that path by conductive shields which are cut so that currents induced in the shields do not oppose changing fields in that magnetic path.

Figure 12:
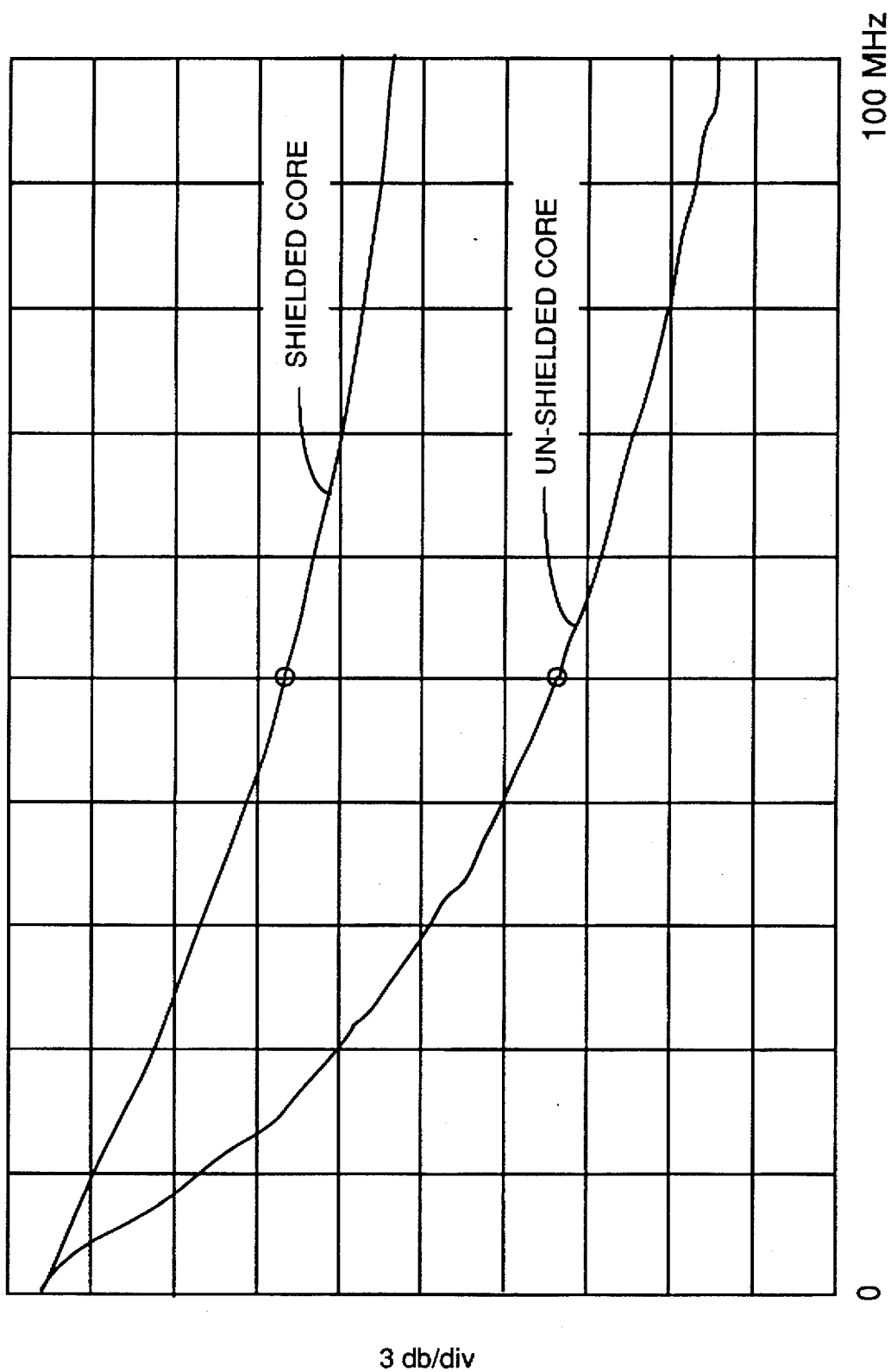
FIG. 12 is a graph of test results obtained during tests of a magnetic device constructed in accordance with the invention.

Referring now to FIG. 12, test results are illustrated of comparative tests on shielded and unshielded cores similar in design to the core illustrated in FIGS. 4–6. Thus, the shielded core is of about 0.3 inch diameter toroidal configuration, being fabricated of ferrite and coated with copper foil, as a shield, in the fashion described hereinbefore. The second core was of similar configuration, but was unshielded so that it could be used as a test reference core. Each core was wound with a two turn primary winding and a twenty turn secondary winding, making each a 1 to 100 impedance matching transformer. The output and input of a standard type network analyzer were matched to 1 ohm and 100 ohms, respectively, using resistive impedance matching networks.

In swept frequency response measurements made with respect to both cores, the transformer with the shielding exhibited about three times the bandwidth as the unshielded transformer. The improvement is believed to result from a corresponding three fold decrease in leakage inductance in the shielded core, as compared to the unshielded core.

What is claimed is:

1. A magnetic core defining a field path, said core being surrounded by a non-magnetic conductive shield, that acts to isolate said core, with the shield having at least one current interrupting cut region formed therein.

2. The magnetic core defined in claim 1, further including a gap formed in the magnetic core at a location that is exposed by an opening formed in said shield.

3. The magnetic core of claim 2 wherein said gap is located at a position near a magnetic recording medium.

4. The magnetic core of claim 3 wherein the magnetic recording medium associated with said gap is provided with a conductive backing that cooperates with the recording medium to provide an additional shielding function, and wherein a separation between the conductive backing and the rest of the core shield is provided to form a portion of the current interrupting cut in said shield.

5. The magnetic core of claim 2, further including at least one winding linking the magnetic core in proximity of said shield.

6. The magnetic core of claim 5 wherein a portion of said winding structure acts as a shield for said core.

7. The magnetic core of claim 2, further including magnetic field sensing means associated with the gap in said core.

8. The core of claim 7 wherein the field sensing element is an magneto-resistive element.

9. The magnetic core of claim 1, further including two or more windings wrapped around the core in proximity to said shield.

10. The magnetic core of claim 1, further including first and second winding means associated with the core to define a transformer structure wherein said core and said winding means are separated by said shield.

11. The core defined in claim 1 wherein a portion of said field path is comprised of a core formed of high permeability material.

12. The core of claim 11 further including a core of toroidal shape.

13. The core of claim 11 wherein the shield surrounds a substantial portion of the magnetic path of the device.

14. The core of claim 11 wherein the shield is comprised of a conductive material having a thickness in excess of the skin depth in the material at the operating frequency.

15. The core of claim 14 wherein the shield is comprised of copper having a thickness slightly in excess of ten micro meters.

16. The core of claim 11 comprised of two core portions adhered together about a non-magnetic gap structure, said core having a winding window formed therein through which at least one winding is wound.

17. The magnetic core of claim 16 wherein the shield is comprised of a first conductive layer deposited upon one side and the ends of the core and a second conductive layer deposited upon the other side and the ends of said core.

18. The magnetic core of claim 1 wherein the shield surrounds a substantial portion of a toroidal core and overlaps upon itself along the periphery of the toroid by an amount in excess of the dimension of the current interrupting cut.

19. The magnetic core of claim 1 wherein the shield surrounds a substantial portion of a toroidal core and abuts against itself along the periphery of the toroid with a separation sufficient to form the current interrupting cut.

20. The magnetic core of claim 1 wherein the core is of toroidal shape, and generally square cross-section, being covered with a thin shield of copper having four current interrupting cuts formed therein near that corners of the cross-section.

* * * * *